United States Patent
Weldon et al.

(10) Patent No.: US 9,712,899 B2
(45) Date of Patent: Jul. 18, 2017

(54) HYBRID OPTICAL SWITCH FOR SOFTWARE-DEFINED NETWORKING

(71) Applicant: Alcatel-Lucent USA Inc., Murray Hill, NJ (US)

(72) Inventors: Marcus Weldon, Summit, NJ (US); Aref Chowdhury, Berkeley Heights, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 200 days.

(21) Appl. No.: 14/567,328

(22) Filed: Dec. 11, 2014

(65) Prior Publication Data

US 2016/0173964 A1  Jun. 16, 2016

(51) Int. Cl.
*H04J 14/00* (2006.01)
*H04Q 11/00* (2006.01)
*H04J 14/02* (2006.01)

(52) U.S. Cl.
CPC .......... *H04Q 11/0003* (2013.01); *H04J 14/02* (2013.01); *H04J 14/0212* (2013.01);
(Continued)

(58) Field of Classification Search
CPC .................................................. H04J 14/0213
See application file for complete search history.

(56) References Cited

U.S. PATENT DOCUMENTS

| | | | | |
|---|---|---|---|---|
| 5,404,240 A | * | 4/1995 | Nishio ............... | H04Q 11/0005 398/1 |
| 6,519,062 B1 | * | 2/2003 | Yoo ........................ | H04L 45/00 398/49 |

(Continued)

FOREIGN PATENT DOCUMENTS

| | | |
|---|---|---|
| EP | 2963874 A1 | 1/2016 |
| WO | WO0186998 A1 | 11/2001 |
| WO | WO2014161291 A1 | 10/2014 |

OTHER PUBLICATIONS

Gorshe, Steve, "A Tutorial on ITU-T G.709 Optical Transport Networks (OTN)," Optical Transport Networks Technology White Paper, PMC-Sierra, Inc., Document No. PMC-2081250, Issue 1 (77 pages).

(Continued)

*Primary Examiner* — Ken N Vanderpuye
*Assistant Examiner* — Amritbir Sandhu
(74) *Attorney, Agent, or Firm* — Mendelsohn Dunleavy, P.C.; Yuri Gruzdkov

(57) ABSTRACT

We disclose a hybrid optical switch configured to switch optical channels based on their respective utilization factors. In an example embodiment, optical channels having relatively low utilization factors are unwrapped down to payload units, which are then switched electrically, e.g., using an Optical-Transport-Network (OTN) switch, in a manner that tends to increase the utilization factors of the optical channels that carry the switched payload units. In contrast, optical channels having relatively high utilization factors are switched optically, e.g., using a reconfigurable optical add/drop multiplexer, without being unwrapped. The hybrid optical switch may advantageously be deployed in a network node subjected to relatively high traffic-volume fluctuations because the switch tends to improve optical-channel utilization when the traffic volume is relatively low and to decrease the workload of the corresponding OTN switch when the traffic volume is relatively high.

24 Claims, 4 Drawing Sheets

(52) U.S. Cl.
CPC ...... *H04J 14/0213* (2013.01); *H04Q 11/0062* (2013.01); *H04Q 2011/0075* (2013.01)

(56) References Cited

U.S. PATENT DOCUMENTS

| | | | |
|---|---|---|---|
| 6,529,301 B1* | 3/2003 | Wang | H04Q 11/0005 398/82 |
| 6,545,783 B1* | 4/2003 | Wu | G02F 1/31 398/83 |
| 6,647,208 B1* | 11/2003 | Kirby | H04Q 11/0005 398/45 |
| 6,850,704 B1* | 2/2005 | Dave | H04L 1/22 370/217 |
| 6,950,450 B2 | 9/2005 | Simsarian et al. | |
| 6,957,018 B2* | 10/2005 | Araki | H04L 49/30 370/366 |
| 7,145,704 B1* | 12/2006 | Islam | G02B 26/0808 359/108 |
| 7,269,348 B1 | 9/2007 | Tse-Au | |
| 7,286,771 B2 | 10/2007 | Helbing et al. | |
| 7,292,784 B2* | 11/2007 | Lee | H04Q 11/0005 398/166 |
| 7,343,066 B2 | 3/2008 | Doerr et al. | |
| 7,613,394 B2* | 11/2009 | Takita | G02B 6/359 398/45 |
| 7,733,929 B2 | 6/2010 | Sasada et al. | |
| 7,769,293 B2* | 8/2010 | Park | H04Q 11/0005 385/16 |
| 7,948,975 B2 | 5/2011 | Markus et al. | |
| 7,965,950 B2 | 6/2011 | Childers et al. | |
| 8,009,986 B2 | 8/2011 | Chang et al. | |
| 8,041,213 B2 | 10/2011 | Nakano | |
| 8,116,630 B2 | 2/2012 | Wisseman | |
| 8,126,330 B2 | 2/2012 | Wisseman | |
| 8,190,027 B2 | 5/2012 | Boduch et al. | |
| 8,300,995 B2 | 10/2012 | Colbourne | |
| 8,391,709 B2 | 3/2013 | Colbourne et al. | |
| 8,639,116 B2 | 1/2014 | Hui et al. | |
| 8,670,669 B2 | 3/2014 | Gazzola et al. | |
| 8,693,880 B2* | 4/2014 | Sakauchi | H04J 14/0204 385/24 |
| 2002/0114035 A1* | 8/2002 | Graves | H04J 14/0212 398/19 |
| 2002/0163691 A1* | 11/2002 | Wong | G02B 6/272 398/27 |
| 2003/0039003 A1* | 2/2003 | Jakobik | H04J 14/0209 398/43 |
| 2003/0128911 A1 | 7/2003 | Ravikanth et al. | |
| 2003/0133641 A1* | 7/2003 | Yoo | B82Y 20/00 385/14 |
| 2003/0206743 A1* | 11/2003 | Yanagimachi | H04J 14/0208 398/100 |
| 2006/0083460 A1* | 4/2006 | Tamil | H04L 45/00 385/17 |
| 2007/0153845 A1 | 7/2007 | Bernasconi et al. | |
| 2008/0013947 A1* | 1/2008 | Peloso | H04B 10/00 398/5 |
| 2009/0238565 A1* | 9/2009 | Graves | H04Q 11/0005 398/48 |
| 2011/0135302 A1 | 6/2011 | Kang | |
| 2011/0229137 A1 | 9/2011 | Gripp et al. | |
| 2011/0255552 A1 | 10/2011 | Ellegard | |
| 2012/0128347 A1* | 5/2012 | Sakamoto | H04J 14/0204 398/9 |
| 2013/0101292 A1* | 4/2013 | Lanzone | H04J 3/1652 398/66 |
| 2013/0108265 A1* | 5/2013 | Zami | H04J 14/0204 398/48 |
| 2013/0195462 A1* | 8/2013 | Ghioni | H04J 14/0219 398/83 |
| 2015/0244453 A1* | 8/2015 | Bottari | H04J 14/00 398/5 |
| 2016/0037240 A1 | 2/2016 | Yang et al. | |
| 2016/0191188 A1* | 6/2016 | Butler | H04J 14/021 398/48 |

OTHER PUBLICATIONS

Melle, Serge et al., "Comparing Optical & OTN Switching Architectures in Next-Gen 100Gb/s Networks," Fiber optics and optical communications, Optical Society of America, OFC/NFOEC Technical Digest, 2013 (3 pages).

"Meeting Pervasive Ethernet-based Service Demands with Integrated Packet Transport," http://www.alcatel-lucent.com/products/1830-photonic-service-switch.com, 2014 [retrieved on Sep. 8, 2014]. Retrieved from the Internet: <URL: http://resources.alcatel-lucentcom/?cid=164886.htlm> (18 pages).

"Enabling OTN Switching over Packet/Cell Fabrics," http://www.pmcs.com, 2011, [retrieved on Sep. 5, 2014]. Retrieved from the Internet: <URL: https://pmcs.com/cgi-bin/document.pl?docnum=2114338> (23 pages).

Al-Fares, Mohammad et al., "A Scalable, Commodity Data Center Network Architecture," ACM SIGCOMM Computer Communication Review, vol. 38, No. 4, Oct. 2008, pp. 63-74.

Harald Knudsen-Baas, Per, "OTN switching," Masters Thesis, NTNU, Norwegian University of Science and Technology, Department of Telematics, 2011 (140 pages).

Farrington, Nathan et al., "Helios: A Hybrid Electrical/Optical Switch Architecture for Modular Data Centers," ACM SIGCOMM Computer Communication Review, vol. 40 No. 4, 2010, pp. 339-350.

Wang, Guohui et al., "Your Data Center is a Router: The Case for Reconfigurable Optical Circuit Switched Paths," Proc. ACM Hotnets-VIII, Oct. 2009 (6 pages).

Schmitt, Andrew, "Integrated OTN Switching Virtualizes Optical Networks," White Paper, Optical Infonetics Research, Inc., 2012 (12 pages).

"Next-Generation Optical Transport Networks," www.jdsu.com, 2010 [retrieved on Sep. 8, 2014]. Retrieved from the Internet: <URL: http://www.jdsu.com/ProductLiterature/next-generation-optical-transport-network-white-paper.pdf> (12 pages).

"Optical Transport Network Switching: Creating efficient and cost-effective optical transport networks," www.networks.nokia.com, 2011 [retrieved on Sep. 8, 2014]. Retrieved from the Internet: <URL: http://networks.nokia.com/system/files/document/optical_transport_network_switching.pdf> (16 pages).

"OTN and NG-OTN: Overview," www.geant3.archive.geant.net, 2011 [retrieved on Sep. 8, 2014]. Retrieved from the Internet: <URL: http://geant3.archive.geant.net/Research/Future_Network_Research/Documents/OTN_and_NG-OTN_Overview.pdf> (8 pages).

"OTN Paves the Way for the Transport Medium of the Future-Requirements for Measuring Equipment," www.jdsu.com, 2010 [retrieved on Sep. 8, 2014]. Retrieved from the Internet: <URL: www.jdsu.com/ProductLiterature/otn_wp_tnt_tm_ae.pdf> (10 pages).

"The Key Benefits of OTN Networks," www.fujitsu.com, 2010 [retrieved on Sep. 8, 2014]. Retrieved from the Internet: <URL: http://www.fujitsu.com/downloads/TEL/fnc/whitepapers/OTN-NetworkBenefitswp.pdf> (9 pages).

"Cloud-Scale Data Center Network Architecture," www.ecsl.cs.sunysb.edu, 2011, [retrieved on Sep. 8, 2014]. Retrieved from the Internet: <URL: www.ecsl.cs.sunysb.edu/tr/rpe22.pdf> (53 pages).

Katrinis, Kostas et al., "SDN control for hybrid OCS/electrical datacenter networks: an enabler or just a convenience?" IEEE Photonics Society Summer Topical Meeting Series, 2013, pp. 242-243.

"The Software Defined Hybrid Packet Optical Datacenter Network," www.calient.net, 2013, [retrieved on Sep. 8, 2014]. Retrieved from the Internet: <URL: http://www.calient.net/download/The-Hybrid-Packet-Optical-Datacenter-Network-Final-10-22-13.pdf> (13 pages).

(56) References Cited

OTHER PUBLICATIONS

"Interfaces for the optical transport network," 2012, [retrieved on Sep. 12, 2014]. Retrieved from the Internet: <URL: https://www.itu.int/rec/dologin_pub.asp?lang=e&id=T-REC-G.709-201202-I!!PDF-E&type=items> (238 pages).
"Agile Core Transport," http://www.advaoptical.com, 2012 [retrieved on Sep. 8, 2014]. Retrieved from the Internet: <URL: http://www.advaoptical.com/~/media/Resources/White%20Papers/WP_Agile_Core_Transport.ashx> (11 pages).
International Search Report and Written Opinion; Mailed Mar. 3, 2016 for PCT Application No. PCT/US2015064177.

* cited by examiner

100

400

HYBRID OPTICAL SWITCH FOR SOFTWARE-DEFINED NETWORKING

BACKGROUND

Field

The present disclosure relates to optical communication equipment and, more specifically but not exclusively, to a hybrid optical switch for software-defined networking.

Description of the Related Art

This section introduces aspects that may help facilitate a better understanding of the disclosure. Accordingly, the statements of this section are to be read in this light and are not to be understood as admissions about what is in the prior art or what is not in the prior art.

Optical communications networks are widely used for providing various communication services to clients. To address the need for higher transmission capacities, some optical communications networks are configured to use wavelength division multiplexing (WDM), wherein a plurality of modulated carrier wavelengths are concurrently transmitted in an optical fiber. Exploiting the undivided wavelength granularity of WDM, a reconfigurable optical add/drop multiplexer (ROADM) may be used to enable the corresponding optical communications network to add and/or drop selected carrier wavelengths at a network node while allowing other carrier wavelengths to traverse the network node in an optically transparent manner.

In an optical communications network having a generic mesh topology, traffic volume through some network nodes, e.g., through the hub nodes, may fluctuate significantly over time. For example, during some time periods, traffic-volume bursts through a hub node may approach or even exceed the node's maximum throughput capacity. During some other time periods, the traffic volume may fall to a relatively low level, e.g., lower than about 50% of the node's maximum throughput capacity. Disadvantageously, such traffic-volume fluctuations may lead to suboptimal utilization of the network resources.

SUMMARY OF SOME SPECIFIC EMBODIMENTS

Disclosed herein are various embodiments of a hybrid optical switch configured to switch optical channels based on their respective utilization factors. In an example embodiment, optical channels having relatively low utilization factors are unwrapped down to payload units, which are then switched electrically, e.g., using an Optical-Transport-Network (OTN) switch, in a manner that tends to increase the utilization factors of the optical channels that carry the switched payload units. In contrast, optical channels having relatively high utilization factors are switched optically, e.g., using a reconfigurable optical add/drop multiplexer, without being unwrapped. Embodiments of the hybrid optical switches disclosed herein may advantageously be deployed in a network node subjected to relatively high traffic-volume fluctuations because the hybrid optical switch tends to improve optical-channel utilization when the traffic volume is relatively low and to decrease the workload of the corresponding OTN switch when the traffic volume is relatively high.

According to one embodiment, provided is an apparatus comprising: a first wavelength-selective switch configured to receive a first WDM signal and direct a first set of optical channels of the first WDM signal through a first branch and a second set of the optical channels of the first WDM signal through a second branch, wherein the first set of optical channels includes one or more optical channels whose optical-channel-utilization factor is smaller than a threshold value, and the second set of optical channels includes one or more optical channels whose optical-channel-utilization factor is greater than the threshold value; the first branch configured to electrically switch payload units corresponding to the first set of optical channels to generate a third set of optical channels; the second branch configured to optically switch the one or more optical channels of the second set of optical channels to generate a fourth set of optical channels; and a second wavelength-selective switch configured to receive the third set of optical channels from the first branch and the fourth set of optical channels from the second branch and further configured to combine the third set of optical channels and the fourth set of optical channels to generate a second WDM signal.

According to another embodiment, provided is a signal-processing method comprising the steps of: (A) comparing a utilization factor of an optical channel with a threshold value; (B) if the utilization factor is smaller than the threshold value, switching the optical channel using a first switch configured to electrically switch payload units carried by the optical channel; and (C) if the utilization factor is greater than the threshold value, switching the optical channel using a second switch configured to optically switch the optical channel.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

As used herein, the term Optical Transport Network (OTN) refers to networks configured to use the ITU-T G.709/Y.1331 standard for WDM signals, which standard is incorporated herein by reference in its entirety. OTN transport uses a standardized digital wrapper that can carry a wide range of services transparently across the corresponding optical network. Unlike the legacy ROADM technology, OTN has sub-wavelength granularity. In various embodiments disclosed herein, the undivided wavelength granularity of ROADMs and the sub-wavelength granularity of OTN are leveraged to obtain better (e.g., more-optimal) utilization patterns for the network resources, e.g., by (i) freeing up some WDM channels during periods of relatively low traffic volume and (ii) enabling an optical bypass of the electrical switching paths during periods of relatively high traffic volume. It is envisioned that at least some of the disclosed embodiments may advantageously be used in long-haul, metro, and data-center optical networking.

Figure 1:
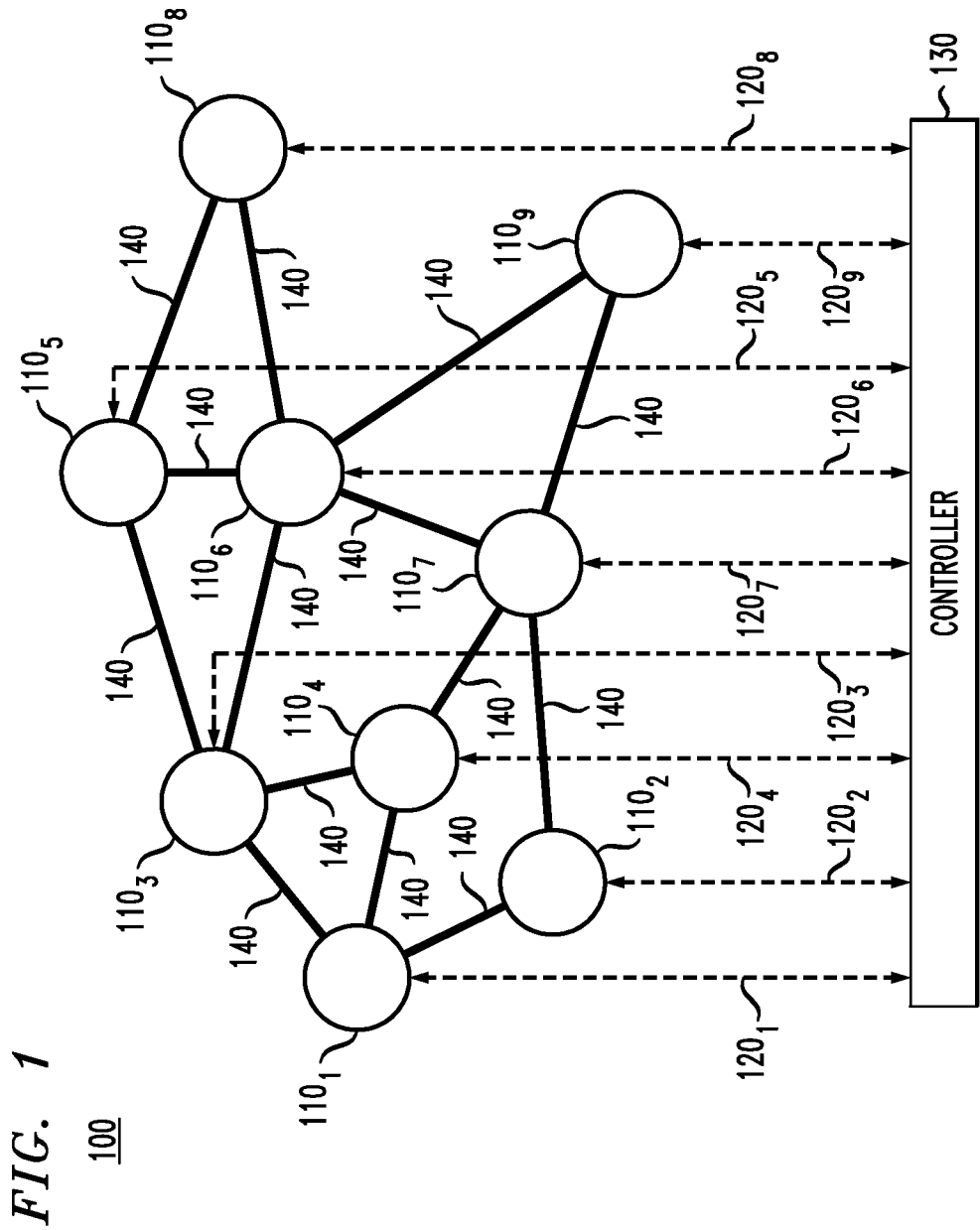
FIG. 1 shows a block diagram of an optical communications network in which various disclosed embodiments can be practiced.

FIG. 1 shows a block diagram of an optical communications network 100 in which various disclosed embodiments can be practiced. Network 100 is illustratively shown as comprising a network controller 130 and network nodes $110_1$-$110_9$ interconnected by a plurality of optical-transport links 140 as indicated in FIG. 1. In an example embodiment, each of nodes $110_1$-$110_9$ can operate as an ingress node, as a relay node, and/or as an egress node. Each node $110_i$ is connected to controller 130 via a corresponding control link $120_i$, where i=1, 2, . . . , 9. Control links $120_i$ operate to enable remote configuration and reconfiguration of nodes 110. Each control link $120_i$ can be a wireline link, a wireless link, an optical link, or any combination thereof. In some embodiments, controller 130 may be an SDN-type controller, where SDN stands for software-defined networking. Each optical transport link 140 can be implemented using a suitable optical fiber or fiber-optic cable.

In operation, controller 130 may use control links 120 to appropriately configure nodes $110_1$-$110_9$ to perform various signal-processing and routing functions. For example, a node 110 may be configured to perform some or all of the following:

(A) receive client signals, e.g., from the corresponding access or local-area network (not explicitly shown in FIG. 1) configured to connect the node and the corresponding clients;

(B) insert a client signal into a frame payload area, which together with the corresponding overhead information forms an Optical Payload Unit (OPU);

(C) extract a client signal from a frame payload area of an OPU;

(D) apply extracted client signals to the corresponding access or local-area network connected to the node for delivery to the corresponding clients;

(E) add an operation-administration-management (OAM) overhead to an OPU to generate a corresponding Optical Data Unit (ODU);

(F) perform various forward-error-correction (FEC) functions;

(G) add a transport (e.g., frame-alignment) overhead to generate an Optical Transport Unit (OTU);

(H) map OTUs onto various carrier wavelengths (optical channels, OCh's) of the operative WDM multiplex;

(I) modulate a carrier wavelength to optically carry an OTU;

(J) multiplex two or more modulated carrier wavelengths to generate a corresponding WDM signal;

(K) de-multiplex a WDM signal into individual constituent modulated carrier wavelengths;

(L) add one or more modulated carrier wavelengths to an existing WDM signal;

(M) drop one or more modulated carrier wavelengths from an existing WDM signal;

(N) transmit and receive OAM information on a dedicated carrier wavelength assigned to an optical supervisory channel (OSC);

(O) route WDM signals between different optical-transport links 140 connected to the node; and (P) perform 3R (re-time, re-transmit, re-shape) signal regeneration.

Network 100 is shown in FIG. 1 as having a partial mesh topology, in which each node $110_i$ is directly connected to only some of nodes $110_j$, where i≠j. However, various embodiments disclosed herein are not limited only to partial mesh topologies. For example, at least some embodiments can be adapted for an optical network having the full mesh topology, in which each node 110; is directly connected to each of nodes $110_j$, where i≠j. Other alternative network topologies are also contemplated. In various alternative embodiments, network 100 can have more or fewer than nine nodes 110 interconnected using the corresponding full mesh topology, partial mesh topology, or any other suitable network topology.

Suitable hardware for implementing optical-transmitter functions in a node 110 is disclosed, e.g., in U.S. Pat. Nos. 7,733,929, 7,286,771, and 6,950,450 and U.S. Patent Application Publication No. 2007/0153845, all of which are incorporated herein by reference in their entirety. Suitable hardware for implementing optical-receiver functions in a node 110 is disclosed, e.g., in U.S. Pat. No. 7,965,950 and U.S. Patent Application Publication No. 2011/0229137, both of which are incorporated herein by reference in their entirety. Suitable hardware for implementing optical-signal switching/relay functions in a node 100 is disclosed, e.g., in U.S. Pat. Nos. 8,391,709, 8,300,995, 8,190,027, 8,126,330, 8,041,213, and 7,343,066, all of which are incorporated herein by reference in their entirety.

Figure 2:
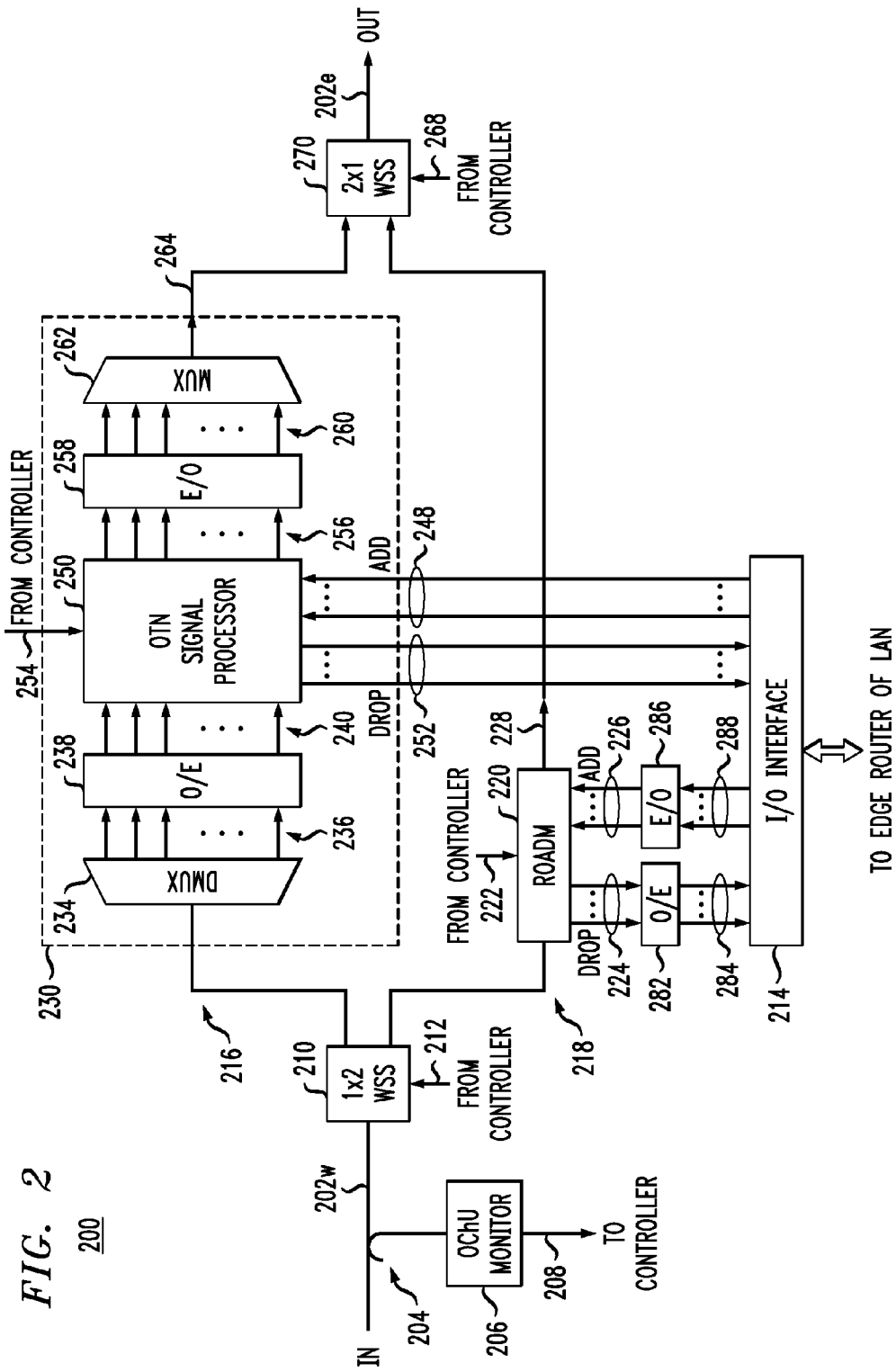
FIG. 2 shows a block diagram of a hybrid OTN/ROADM switch that can be used in the optical communications network of FIG. 1 according to an embodiment of the disclosure.
Figure 4:
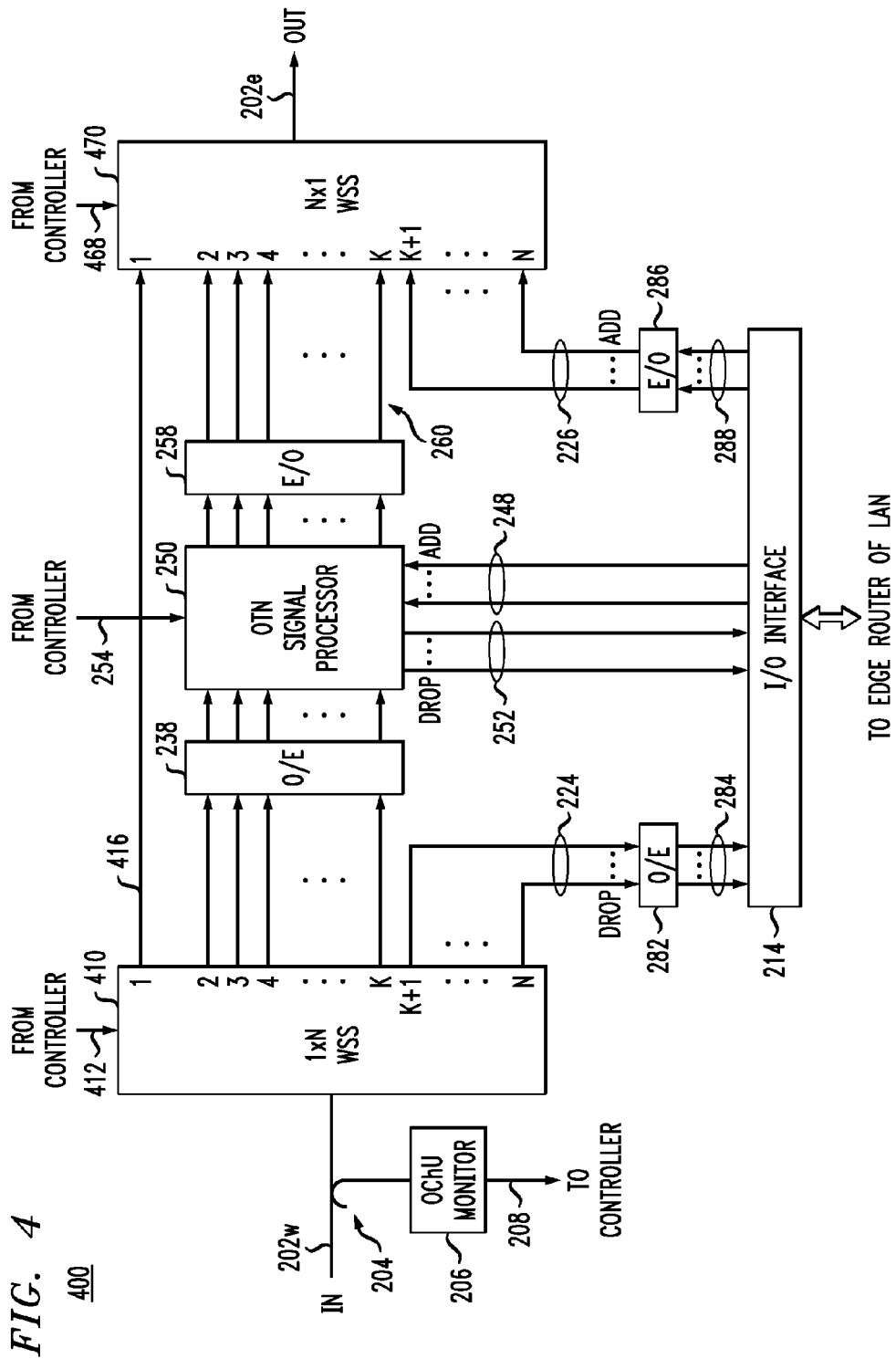
FIG. 4 shows a block diagram of a hybrid OTN/ROADM switch that can be used in the optical communications network of FIG. 1 according to an alternative embodiment of the disclosure.

In an example embodiment, at least one of nodes $110_1$-$110_9$, e.g., node $110_6$, comprises a hybrid OTN/ROADM switch (not explicitly shown in FIG. 1, see FIGS. 2 and 4).

A hybrid OTN/ROADM switch may comprise an OTN branch and a ROADM branch, wherein at least some of the signal ports that feed signals in and/or out of the two branches are interconnected, integrated, or configured to operate as shared ports. The OTN branch of the hybrid OTN/ROADM switch enables data-stream aggregation for more efficient use of some wavelength carriers (optical channels) during periods of relatively low traffic volume. The ROADM branch of the hybrid OTN/ROADM switch enables an optical bypass of the electrical switching paths during periods of relatively high traffic volume. Example embodiments of a hybrid OTN/ROADM switch that can be used in a node 110 are described in more detail below in reference to FIGS. 2 and 4. An example embodiment of a method of operating a hybrid OTN/ROADM switch is described in more detail below in reference to FIG. 3.

FIG. 2 shows a block diagram of a hybrid OTN/ROADM switch 200 that can be used in a node 110 (FIG. 1) according to an embodiment of the disclosure. Switch 200 is coupled to unidirectional optical links 202w and 202e. More specifically, optical link 202w is configured to carry optical signals toward switch 200, and optical link 202e is configured to carry optical signals away from switch 200. One of ordinary skill in the art will understand how to use two or more instances (copies) of switch 200 to enable the corresponding network node to be coupled to bidirectional optical links and/or more than two optical links. For example, U.S. Pat. No. 8,009,986 discloses a general architecture of a network node that can be used to connect two or more switches 200 in a hub node, such as node 1106, of the corresponding optical communications network to enable appropriate signal switching at such a hub node. U.S. Pat. No. 8,009,986 is incorporated herein by reference in its entirety.

Switch 200 includes an optical-channel utilization (OChU) monitor 206 that is coupled to optical link 202w via an optical tap 204. OChU monitor 206 operates to monitor the levels of utilization of individual optical channels, for example, with respect to the maximum data-throughput capacity of the channel. The measured levels are then reported, e.g., via a control signal 208, to a corresponding controller. This controller may be either a local controller placed at the host node or a remote network controller, such as controller 130 (FIG. 1). In the latter case, control signal 208 may be transmitted via a corresponding control link 120 (FIG. 1).

Based on the reported OCh utilization factors, the controller may sort optical channels into two categories. The first category includes optical channels whose OCh utilization factors are below a specified threshold value. The second category includes optical channels whose OCh utilization factors are at or above the specified threshold value. One of ordinary skill in the art will appreciate that the categorization of an individual optical channel as belonging to the first category or the second category may change over time, e.g., due to the above-mentioned traffic-volume fluctuations.

As used herein, the term "optical-channel-utilization factor" refers to a ratio of an actual data throughput attained by an optical channel to the maximum data-throughput capacity of that optical channel. As such, an optical-channel-utilization factor may have any value from zero to one, and may be expressed using percentage points. Due to the varying traffic volume and/or pattern, the optical-channel-utilization factor of an individual optical channel may change over time. OChU monitor 206 may be configured to report to the controller an instant value of the optical-channel-utilization factor observed at a particular time or an averaged value of the optical-channel-utilization factor, with the averaging being performed over a predetermined time interval. In some embodiments, the predetermined time interval may be adjustable, and its duration may be selected, e.g., to achieve an approximately optimal performance of the corresponding switch, such as switch 200 (FIG. 2) or 400 (FIG. 4). Depending on the traffic pattern presented to the switch, optical-channel-utilization factors of some optical channels may be completely independent of one other or may exhibit some degree of interdependence or correlated behavior.

Based on the above-indicated OCh sorting, the controller generates a control signal 212 for a wavelength-selective switch (WSS) 210 coupled to optical link 202w as indicated in FIG. 2. Based on control signal 212, WSS 210 adopts a configuration under which the optical channels sorted into the first category are routed through an OTN branch 216 of switch 200, and the optical channels sorted into the second category are routed through a ROADM branch 218 of the switch. Both OTN branch 216 and ROADM branch 218 feed a WSS 270 coupled to optical link 202e as indicated in FIG. 2. Similar to WSS 210, WSS 270 is configurable based on a control signal 268 received from the controller. As already alluded to above, the configurations of both WSS 210 and WSS 270 may dynamically change over time.

OTN branch 216 includes an OTN switch 230 connected to an input/output (I/O) interface 214 of switch 200 as indicated in FIG. 2. In an example embodiment, OTN switch 230 comprises an optical de-multiplexer (DMUX) 234, an optical-to-electrical (O/E) converter 238, an OTN signal processor 250, an electrical-to-optical (E/O) converter 258, and an optical multiplexer (MUX) 262.

In operation, a WDM signal directed by WSS 210 to OTN branch 216 is de-multiplexed into individual constituent WDM components (modulated carrier wavelengths, optical channels) 236 after passing through optical DMUX 234. In an example embodiment, optical DMUX 234 has a sufficient number of output ports to be able to de-multiplex a WDM signal carrying all of the optical channels that may be applied to optical link 202w or operable in the corresponding network. Thus, when the WDM signal directed by WSS 210 to OTN branch 216 carries fewer than all of the operable optical channels, some output ports of optical DMUX 234 may remain idle and not receive a corresponding WDM component. The instant set of idle output ports in optical DMUX 234 depends on the configuration of WSS 210 and, as such, may change over time.

Each of individual WDM components 236 is converted into a corresponding electrical digital signal 240 in O/E converter 238. In an example embodiment, O/E converter 238 comprises a plurality of optical receivers (not explicitly shown in FIG. 2), e.g., one optical receiver per output port of optical DMUX 234. Electrical digital signals 240 are then applied to OTN signal processor 250 for processing therein.

In an example embodiment, OTN signal processor 250 is configured to perform the following signal processing. OTN signal processor 250 may unwrap each of the OTUs carried by electrical digital signals 240 down to the corresponding OPUs, e.g., as known in the art. Depending on the intended destination(s), some of the OPUs may be dropped at the host node by being directed through one or more drop ports 252 of OTN signal processor 250 to I/O interface 214, and then further directed to an edge router of the corresponding local-area network (LAN), e.g., as indicated in FIG. 2. The remaining (non-dropped) OPUs and the additional OPUs received by OTN signal processor 250 through one or more of its add ports are re-wrapped to generate the corresponding plurality of OTUs 256, e.g., as known in the art. OTUs 256 are mapped onto a subset of the operative optical channels in a manner that causes at least some or, if possible, all of these optical channels to have OCh utilization factors that are greater than the threshold value previously used to delineate the first and second OCh categories. The mapping is used to direct the OTUs to E/O converter 258 through appropriate output ports of OTN signal processor 250. The signal processing performed in OTN signal processor 250 may be controlled, e.g., via a control signal 254 received from the network controller, such as controller 130 (FIG. 1).

E/O converter 258 operates to generate a plurality of WDM components 260 by modulating each subset of OTUs 256 onto a respective (mapped-to) carrier wavelength. In an example embodiment, E/O converter 258 comprises a plurality of optical transmitters (not explicitly shown in FIG. 2), e.g., one optical transmitter per input port of optical MUX 262. Depending on the particulars of the OPU re-wrapping and OCh mapping performed in OTN signal processor 250, some of the optical transmitters in E/O converter 258 and the corresponding input ports of optical MUX 262 may be idle. One of ordinary skill in the art will understand that the instant set of idle optical transmitters in E/O converter 258 and idle input ports of optical MUX 262 may change over time.

Optical MUX 262 operates to optically multiplex WDM components 260 and apply the resulting WDM signal 264 to WSS 270 as indicated in FIG. 2. In an example embodiment, the signal processing performed in OTN signal processor 250 may cause the WDM signal applied by optical MUX 262 to WSS 270 to have fewer WDM components (occupied optical channels) than the WDM signal received by optical DMUX 234 from WSS 210. In some configurations, the WDM signal applied by optical MUX 262 to WSS 270 may have at least one modulated carrier wavelength that is not present in the WDM signal received by optical DMUX 234 from WSS 210.

ROADM branch 218 includes a ROADM 220 connected to I/O interface 214 of switch 200 and configured to receive a WDM signal directed by WSS 210 to the ROADM branch, as indicated in FIG. 2. The configuration of ROADM 220 is controllable via a control signal 222 received from the network controller, such as controller 130 (FIG. 1). In operation, ROADM 220 may direct one or more WDM components that are to be dropped at the host node, through one or more drop ports 224, to an O/E converter 282. In an example embodiment, O/E converter 282 comprises a plurality of optical receivers (not explicitly shown in FIG. 2), e.g., one optical receiver per drop port of ROADM 220. Each of these optical receivers of O/E converter 282 operates to convert the received WDM component into a corresponding one of electrical digital signals 284 and then apply that signal to I/O interface 214 for further application to the edge router of the corresponding LAN. ROADM 220 may also receive, through one or more add ports 226, one or more WDM components that are to be added at the host node. These WDM components are generated by an E/O converter 286 based on electrical digital signals 288 received through I/O interface 214 from the edge router of the corresponding LAN.

ROADM 220 further operates to combine the pass-through WDM components of the WDM signal received from WSS 210 with the WDM components generated by E/O converter 286 to generate a corresponding output WDM signal 228. WSS 270 operates to combine (i) WDM signal 228 generated by ROADM 220 and (ii) WDM signal 264 generated by OTN switch 230, and then apply the resulting combined WDM signal to optical link 202e. In an example embodiment, control signals 212, 222, 254, 268, and any other control signals required from the network controller for proper operation of switch 200 may be transmitted through the corresponding control link 120 (FIG. 1).

Figure 3:
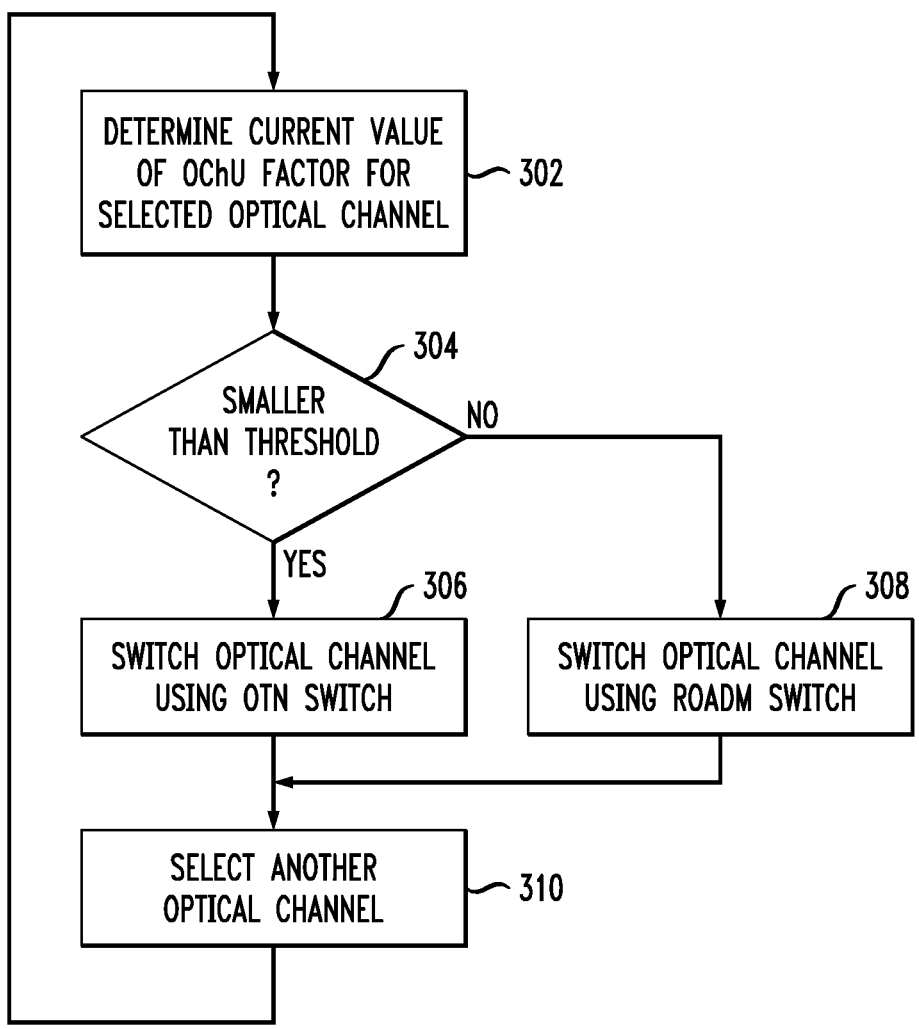
FIG. 3 shows a flowchart of a signal-processing method that can be used at a node of the optical communications network shown in FIG. 1 according to an embodiment of the disclosure.

FIG. 3 shows a flowchart of a signal-processing method 300 that can be used at a network node 110 (FIG. 1) according to an embodiment of the disclosure. Some embodiments of method 300 may be used to operate hybrid switches disclosed herein, such as switch 200 (FIG. 2) or switch 400 (FIG. 4).

At step 302 of method 300, a competent entity (e.g., OChU monitor 206, FIG. 2; controller 130, FIG. 1) in the corresponding optical communications network (e.g., network 100, FIG. 1) is configured to determine the current value of the OChU factor for a selected optical channel at a selected network node (e.g., node 110b, FIG. 1). As already indicated above, the OChU factor can be expressed in percentage points of the maximum data throughput supported by the optical channel.

At step 304, the OChU factor determined at step 302 is compared with a threshold value. If the OChU factor is smaller than the threshold value, then the processing of method 300 is directed to step 306. If the OChU factor is greater than or equal to the threshold value, then the processing of method 300 is directed to step 308.

At step 306, the network node is configured to switch the selected optical channel using an OTN switch (e.g., 230, FIG. 2) located at the node. As indicated above, e.g., in the description of FIG. 2, such switching may include one or more of the following: (i) O/E conversion; (ii) rewrapping of the OPUs carried by the optical channel into new OTUs; (iii) adding OPUs received from the LAN; (iv) dropping OPUs to the LAN; (v) aggregating OPUs corresponding to two or more different received optical channels into a single OTU; (vi) carrier-wavelength reassignment; and (vii) E/O conversion. A general purpose of the OTN switching performed at step 306 may be to increase the effective OChU factor, preferably to a value that exceeds the threshold value. One of ordinary skill in the art will appreciate that an increase of the effective OChU factor is possible due to the relatively low initial OChU factor and the sub-wavelength granularity of the OTN switch, which enable the concomitant OPU aggregation into new OTUs.

At step 308, the network node is configured to switch the selected optical channel using a ROADM switch (e.g., 220, FIG. 2) located at the node. As indicated above, e.g., in the description of FIG. 2, such switching is performed optically, which enables a bypass of the electrical switching paths in the node. Due to the undivided wavelength granularity of the ROADM switch, the optical channel is switched as a whole, without being unwrapped into the corresponding OPUs. This type of optical switching may be advantageous in this situation because it decreases the workload of the corresponding OTN switch and, as such, lowers the technical requirements to and the potential cost of the OTN switch.

At step 310, a different optical channel is selected, and the processing of method 300 is directed back to step 302.

FIG. 4 shows a block diagram of a hybrid OTN/ROADM switch 400 that can be used in a node 110 (FIG. 1) according to an alternative embodiment of the disclosure. Switch 400 is functionally similar to switch 200 (FIG. 2) and is configured to use some of the same switch elements as the latter switch, which elements are labeled in FIG. 4 using the same reference labels as in FIG. 2. The description of the reused elements is not repeated here, and the reader is referred to the description of FIG. 2 above. Rather, the description of switch 400 primarily focuses on new switch elements used therein and/or main functional similarities of and differences between switches 200 and 400.

One difference between switches 200 and 400 is that the latter switch has a higher degree of integration between its OTN and ROADM branches than the former switch. For example, switch 400 includes WSS switches 410 and 470 that replace and are configured to perform the functions similar to those of WSS switches 210 and 270, DMUX 234, MUX 262, and ROADM 220. More specifically, WSS switch 410 is configured to perform the functions of WSS switch 210 and DMUX 234. WSS switch 470 is configured to perform the functions of WSS switch 270 and MUX 262. WSS switches 410 and 470 taken collectively are configured to perform the functions of ROADM 220.

Based on the above-described OCh sorting into first and second categories, the corresponding controller (e.g., controller 130, FIG. 1) generates a control signal 412 for WSS 410. Based on control signal 412, WSS 410 adopts a configuration under which the optical channels sorted into the first category are routed through its output ports 2 through K, with each of these ports receiving a single optical channel. Thus, similar to DMUX 234 in switch 200, output ports 2-K of WSS 410 in switch 400 provide de-multiplexed WDM components to O/E converter 238.

The configuration adopted by WSS 410 also causes the pass-through optical channels of the second category to be directed to output port 1 of WSS 410, which is directly optically coupled, e.g., using an optical waveguide or fiber 416, to input port 1 of WSS 470. As a result, just like in switch 200, the pass-through optical channels in switch 400 optically bypass the electrical switching paths of the switch. The configuration adopted by WSS 410 further causes the to-be-dropped optical channels of the second category to be directed to output ports (K+1)-N of WSS 410, with each of these ports similarly receiving a single optical channel. As such, output ports (K+1)-N of WSS 410 are configured to operate in a manner similar to drop ports 224 of ROADM 220 (FIG. 2). Likewise, input ports (K+1)-N of WSS 470 are configured to operate in a manner similar to add ports 226 of ROADM 220 (FIG. 2).

Similar to WSS 410, WSS 470 is configurable based on an external control signal 468 received from the controller. In operation, WSS 470 appropriately combines (i) the pass-through optical channels received from WSS 410 through input port 1, (ii) the WDM components 260 received from E/O converter 258 through input ports 2-K, and (iii) the to-be-added WDM components received from E/O converter 286 through input ports (K+1)-N. The resulting WDM signal generated in this manner by WSS 470 is applied to optical link 202*e*.

One of ordinary skill in the art will appreciate that the signal paths that connect output ports 2-K of WSS 410 and input ports 2-K of WSS 470 represent an OTN branch of switch 400 that is functionally similar to OTN branch 216 of switch 200 (FIG. 2). One of ordinary skill in the art will further appreciate that the signal paths connected to output ports 1, (K+1)-N of WSS 410 and input ports 1, (K+1)-N of WSS 470 represent a ROADM branch of switch 400 that is functionally analogous to ROADM branch 218 of switch 200 (FIG. 2).

According to an example embodiment disclosed above in reference to FIGS. 1-4, provided is an apparatus (e.g., 110, FIG. 1; 200, FIG. 2; 400, FIG. 4) comprising: a first wavelength-selective switch (e.g., 210, FIG. 2; 410, FIG. 4) configured to receive a first WDM signal and direct a first set of optical channels (e.g., optical channels belonging to the first category) of the first WDM signal through a first branch (e.g., 216, FIG. 2; signal paths between output/input ports 2-K, FIG. 4) and a second set of the optical channels (e.g., optical channels belonging to the second category) of the first WDM signal through a second branch (e.g., 218, FIG. 2; signal paths between output/input ports 1, (K+1)-N, FIG. 4), wherein the first set of optical channels includes one or more optical channels whose optical-channel-utilization factor is smaller than a threshold value, and the second set of optical channels includes one or more optical channels whose optical-channel-utilization factor is greater than the threshold value; the first branch configured to electrically switch payload units (e.g., OPUs) corresponding to the first set of optical channels; the second branch configured to optically switch the one or more optical channels of the second set of optical channels; and a second wavelength-selective switch (e.g., 270, FIG. 2; 470, FIG. 4) configured to generate a second WDM signal by combining (i) a third set of optical channels (e.g., optical channels of WDM signal 264, FIG. 2; optical channels on input ports 2-K of WSS 470, FIG. 4) generated by the first branch using payload units that have been electrically switched therein and (ii) a fourth set of optical channels (e.g., optical channels of WDM signal 228, FIG. 2; optical channels on input ports 1, (K+1)-N of WSS 470, FIG. 4) optically switched by the second branch.

In some embodiments of the above apparatus, the third set of optical channels has fewer optical channels than the first set of optical channels.

In some embodiments of any of the above apparatus, the third set of optical channels has at least one optical channel having a carrier wavelength that is different from any carrier wavelength of the first set of optical channels.

In some embodiments of any of the above apparatus, the first set of optical channels consists of the one or more optical channels whose optical-channel-utilization factor is smaller than the threshold value.

In some embodiments of any of the above apparatus, the third set of optical channels has at least one optical channel whose optical-channel-utilization factor is greater than the threshold value.

In some embodiments of any of the above apparatus, the apparatus further comprises: an optical-channel-utilization monitor (e.g., 206, FIGS. 2, 4) configured to measure optical-channel-utilization factors of optical channels of the first WDM signal; and an electronic controller (e.g., 130, FIG. 1) connected to the optical-channel-utilization monitor and the first wavelength-selective switch in a manner that enables the electronic controller to use the optical-channel-utilization factors measured by the optical-channel-utilization monitor to configure the first wavelength-selective switch to direct the first set of optical channels through the first branch and the second set of optical channels through the second branch.

In some embodiments of any of the above apparatus, the first wavelength-selective switch is a 1×2 wavelength-selective switch (e.g., 210, FIG. 2); and the second wavelength-selective switch is a 2×1 wavelength-selective switch (e.g., 270, FIG. 2).

In some embodiments of any of the above apparatus, the first branch comprises: an optical de-multiplexer (e.g., 234, FIG. 2) configured to de-multiplex a WDM signal carrying the first set of optical channels into individual modulated carrier wavelengths (e.g., 236, FIG. 2); an optical-to-electrical converter (e.g., 238, FIG. 2) configured to convert the individual modulated carrier wavelengths into a corresponding plurality of electrical digital signals (e.g., 240, FIG. 2); and an OTN signal processor (250, FIG. 2) configured to electrically switch the payload units that are carried by said corresponding plurality of the electrical digital signals.

In some embodiments of any of the above apparatus, the OTN signal processor comprises one or more electrical drop ports (e.g., 252, FIG. 2) connected to an input/output interface (e.g., 214, FIG. 2) that is configured to be disposed between the OTN signal processor and an edge router of a local-area network.

In some embodiments of any of the above apparatus, the OTN signal processor is configurable (e.g., via 254, FIG. 2) to direct at least some of the payload units carried by said corresponding plurality of the electrical digital signals to said one or more drop ports.

In some embodiments of any of the above apparatus, the OTN signal processor comprises one or more electrical add ports (e.g., 248, FIG. 2) connected to an input/output interface (e.g., 214, FIG. 2) that is configured to be disposed between the OTN signal processor and an edge router of a local-area network.

In some embodiments of any of the above apparatus, the OTN signal processor is configurable (e.g., via 254, FIG. 2) to electrically switch payload units corresponding to electrical digital signals applied to said one or more add ports via the input/output interface.

In some embodiments of any of the above apparatus, the first branch further comprises: an electrical-to-optical converter (e.g., 258, FIG. 2) configured to generate a plurality of WDM components (e.g., 260, FIG. 2) by modulating the payload units (e.g., 256, FIG. 2) that have been switched by the OTN signal processor onto a plurality of carrier wavelengths corresponding to the third set of optical channels; and an optical multiplexer (e.g., 262, FIG. 2) configured to multiplex said plurality of WDM components to generate a third WDM signal (e.g., 264, FIG. 2).

In some embodiments of any of the above apparatus, the second wavelength-selective switch is configured to generate the second WDM signal by combining the third WDM signal and the fourth set of optical channels optically switched by the second branch.

In some embodiments of any of the above apparatus, the second branch comprises a reconfigurable optical add/drop multiplexer (e.g., 220, FIG. 2).

In some embodiments of any of the above apparatus, the first wavelength-selective switch is a 1×N wavelength-selective switch (e.g., 410, FIG. 4), where N is a positive integer greater than two; and the second wavelength-selective switch is a N×1 wavelength-selective switch (e.g., 470, FIG. 4).

In some embodiments of any of the above apparatus, the first branch comprises: an optical-to-electrical converter (e.g., 238, FIG. 4) configured to convert individual modulated carrier wavelengths received from a first subset of output ports (e.g., output ports 2-K, FIG. 4) of the first wavelength-selective switch into a corresponding plurality of electrical digital signals; and an OTN signal processor (250, FIG. 4) configured to electrically switch the payload units carried by said corresponding plurality of the electrical digital signals.

In some embodiments of any of the above apparatus, the OTN signal processor comprises one or more electrical drop ports (e.g., 252, FIG. 4) connected to an input/output interface (e.g., 214, FIG. 4) that is configured to be disposed between the OTN signal processor and an edge router of a local-area network.

In some embodiments of any of the above apparatus, the OTN signal processor is configurable (e.g., via 254, FIG. 4) to direct at least some of the payload units carried by said corresponding plurality of the electrical digital signals to said one or more drop ports.

In some embodiments of any of the above apparatus, the OTN signal processor comprises one or more electrical add ports (e.g., 248, FIG. 4) connected to an input/output interface (e.g., 214, FIG. 4) that is configured to be disposed between the OTN signal processor and an edge router of a local-area network.

In some embodiments of any of the above apparatus, the OTN signal processor is configurable (e.g., via 254, FIG. 4) to electrically switch payload units corresponding to electrical digital signals applied to said one or more add ports via the input/output interface.

In some embodiments of any of the above apparatus, the first branch further comprises an electrical-to-optical converter (e.g., 258, FIG. 4) configured to generate a plurality of WDM components (e.g., 260, FIG. 2) by modulating the payload units that have been switched by the OTN signal processor onto a plurality of carrier wavelengths corresponding to the third set of optical channels.

In some embodiments of any of the above apparatus, the second wavelength-selective switch is configured to generate the second WDM signal by combining (i) the plurality of carrier wavelengths corresponding to the third set of optical channels and modulated by electrical-to-optical converter and (ii) the fourth set of optical channels optically switched through the second branch.

In some embodiments of any of the above apparatus, the second branch comprises an optical waveguide or fiber (e.g., 416, FIG. 4) that connects an output port (e.g., output port 1, FIG. 4) of the first wavelength-selective switch and an input port (e.g., input port 1, FIG. 4) of the second wavelength-selective switch.

In some embodiments of any of the above apparatus, the second branch further comprises: a second subset of output ports (e.g., output ports (K+1)-N, FIG. 4) of the first wavelength-selective switch coupled to an input/output interface (e.g., 214, FIG. 4) that is configured to be disposed between the second branch and an edge router of a local-area network; and a subset of input ports (e.g., input ports (K+1)-N, FIG. 4) of the second wavelength-selective switch coupled to the input/output interface.

In some embodiments of any of the above apparatus, the OTN signal processor is configured to operate in accordance with an ITU G.709 standard.

According to another example embodiment disclosed above in reference to FIGS. 1-4, provided is a signal-processing method (e.g., 300, FIG. 3) comprising the steps of: (A) comparing (e.g., 304, FIG. 3) a utilization factor of an optical channel with a threshold value; (B) if the utilization factor is smaller than the threshold value, switching (e.g., 306, FIG. 3) the optical channel using a first switch (e.g., 230, FIG. 2) configured to electrically switch payload units (e.g., OPUs) carried by the optical channel; and (C) if the utilization factor is greater than the threshold value, switching (e.g., 308, FIG. 3) the optical channel using a second switch (e.g., 220, FIG. 2) configured to optically switch the optical channel.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
a first wavelength-selective switch configured to receive a first WDM signal and direct a first set of optical channels of the first WDM signal through a first branch and a second set of the optical channels of the first WDM signal through a second branch, wherein the first set of optical channels includes one or more optical channels whose optical-channel-utilization factor is smaller than a threshold value, and the second set of optical channels includes one or more optical channels whose optical-channel-utilization factor is greater than the threshold value;
the first branch configured to electrically switch payload units corresponding to the first set of optical channels to generate a third set of optical channels, wherein the third set of optical channels has fewer optical channels than the first set of optical channels;
the second branch configured to optically switch the one or more optical channels of the second set of optical channels to generate a fourth set of optical channels; and
a second wavelength-selective switch configured to receive the third set of optical channels from the first branch and the fourth set of optical channels from the second branch and further configured to combine the third set of optical channels and the fourth set of optical channels to generate a second WDM signal.

2. The apparatus of claim 1, wherein the third set of optical channels has at least one optical channel having a carrier wavelength that is different from any carrier wavelength of the first set of optical channels.

3. The apparatus of claim 1, wherein the third set of optical channels has at least one optical channel whose optical-channel-utilization factor is greater than the threshold value.

4. The apparatus of claim 1, further comprising:
an optical-channel-utilization monitor configured to measure optical-channel-utilization factors of optical channels of the first WDM signal; and
an electronic controller connected to the optical-channel-utilization monitor and the first wavelength-selective switch and configured to use the optical-channel-utilization factors measured by the optical-channel-utilization monitor to configure the first wavelength-selective switch to direct the first set of optical channels through the first branch and the second set of optical channels through the second branch.

5. The apparatus of claim 1, wherein:
the first wavelength-selective switch is a 1×2 wavelength-selective switch; and
the second wavelength-selective switch is a 2×1 wavelength-selective switch.

6. The apparatus of claim 1, wherein the first branch comprises:
an optical de-multiplexer configured to de-multiplex a WDM signal carrying the first set of optical channels into individual modulated carrier wavelengths;
an optical-to-electrical converter configured to convert the individual modulated carrier wavelengths into a corresponding plurality of electrical digital signals; and
an OTN signal processor configured to electrically switch the payload units that are carried by said corresponding plurality of the electrical digital signals.

7. The apparatus of claim 6,
wherein the OTN signal processor comprises one or more electrical drop ports connected to an input/output interface that is configured to be disposed between the OTN signal processor and an edge router of a local-area network; and
wherein the OTN signal processor is configurable to direct at least some of the payload units carried by said corresponding plurality of the electrical digital signals to said one or more drop ports.

8. The apparatus of claim 6,
wherein the OTN signal processor comprises one or more electrical add ports connected to an input/output interface that is configured to be disposed between the OTN signal processor and an edge router of a local-area network; and
wherein the OTN signal processor is configurable to electrically switch payload units corresponding to electrical digital signals applied to said one or more add ports via the input/output interface.

9. The apparatus of claim 8, wherein the first branch further comprises:
an electrical-to-optical converter configured to generate a plurality of WDM components by modulating the payload units that have been switched by the OTN signal processor onto a plurality of carrier wavelengths corresponding to the third set of optical channels; and
an optical multiplexer configured to multiplex said plurality of WDM components to generate a third WDM signal; and
wherein the second wavelength-selective switch is configured to generate the second WDM signal by combining the third WDM signal and the fourth set of optical channels optically switched by the second branch.

10. The apparatus of claim 1, wherein the second branch comprises a reconfigurable optical add/drop multiplexer.

11. The apparatus of claim 1, wherein:
the first wavelength-selective switch is a 1×N wavelength-selective switch, where N is a positive integer greater than two; and
the second wavelength-selective switch is a N×1 wavelength-selective switch.

12. The apparatus of claim 1, wherein the first branch comprises:
an optical-to-electrical converter configured to convert individual modulated carrier wavelengths received from a first subset of output ports of the first wavelength-selective switch into a corresponding plurality of electrical digital signals; and
an OTN signal processor configured to electrically switch the payload units carried by said corresponding plurality of the electrical digital signals.

13. The apparatus of claim 12,
wherein the OTN signal processor comprises one or more electrical drop ports connected to an input/output interface that is configured to be disposed between the OTN signal processor and an edge router of a local-area network; and
wherein the OTN signal processor is configurable to direct at least some of the payload units carried by said corresponding plurality of the electrical digital signals to said one or more drop ports.

14. The apparatus of claim 12,
wherein the OTN signal processor comprises one or more electrical add ports connected to an input/output interface that is configured to be disposed between the OTN signal processor and an edge router of a local-area network; and
wherein the OTN signal processor is configurable to electrically switch payload units corresponding to electrical digital signals applied to said one or more add ports via the input/output interface.

15. The apparatus of claim 14,
wherein the first branch further comprises an electrical-to-optical converter configured to generate a plurality of WDM components by modulating the payload units received from the OTN signal processor onto a plurality of carrier wavelengths corresponding to the third set of optical channels; and
wherein the second wavelength-selective switch is configured to generate the second WDM signal by combining (i) the plurality of carrier wavelengths corresponding to the third set of optical channels and modulated by the electrical-to-optical converter and (ii) the fourth set of optical channels optically switched through the second branch.

16. The apparatus of claim 12, wherein the second branch comprises an optical waveguide or fiber that connects an output port of the first wavelength-selective switch and an input port of the second wavelength-selective switch.

17. The apparatus of claim 16, wherein the second branch further comprises:
a second subset of output ports of the first wavelength-selective switch coupled to an input/output interface that is configured to be disposed between the second branch and an edge router of a local-area network; and
a subset of input ports of the second wavelength-selective switch coupled to the input/output interface.

18. The apparatus of claim 16, wherein the OTN signal processor is configured to operate in accordance with an ITU G.709 standard.

19. An apparatus comprising:
a first wavelength-selective switch configured to receive a first WDM signal and direct a first set of optical channels of the first WDM signal through a first branch and a second set of the optical channels of the first WDM signal through a second branch, wherein the first set of optical channels includes one or more optical channels whose optical-channel-utilization factor is smaller than a threshold value, and the second set of optical channels includes one or more optical channels whose optical-channel-utilization factor is greater than the threshold value;
the first branch configured to electrically switch payload units corresponding to the first set of optical channels to generate a third set of optical channels;
the second branch configured to optically switch the one or more optical channels of the second set of optical channels to generate a fourth set of optical channels;
a second wavelength-selective switch configured to receive the third set of optical channels from the first branch and the fourth set of optical channels from the second branch and further configured to combine the third set of optical channels and the fourth set of optical channels to generate a second WDM signal;
wherein the first branch comprises:
an optical-to-electrical converter configured to convert individual modulated carrier wavelengths received from a first subset of output ports of the first wavelength-selective switch into a corresponding plurality of electrical digital signals; and
an OTN signal processor configured to electrically switch the payload units carried by said corresponding plurality of the electrical digital signals;
wherein the OTN signal processor comprises one or more electrical drop ports connected to an input/output interface that is configured to be disposed between the OTN signal processor and an edge router of a local-area network; and
wherein the OTN signal processor is configurable to direct at least some of the payload units carried by said corresponding plurality of the electrical digital signals to said one or more drop ports.

20. The apparatus of claim 19, wherein the first branch further comprises an optical de-multiplexer configured to generate the individual modulated carrier wavelengths by de-multiplexing one or more WDM signals received from the first wavelength-selective switch.

21. An apparatus comprising:
a first wavelength-selective switch configured to receive a first WDM signal and direct a first set of optical channels of the first WDM signal through a first branch and a second set of the optical channels of the first WDM signal through a second branch, wherein the first set of optical channels includes one or more optical channels whose optical-channel-utilization factor is smaller than a threshold value, and the second set of optical channels includes one or more optical channels whose optical-channel-utilization factor is greater than the threshold value;
the first branch configured to electrically switch payload units corresponding to the first set of optical channels to generate a third set of optical channels;
the second branch configured to optically switch the one or more optical channels of the second set of optical channels to generate a fourth set of optical channels;
a second wavelength-selective switch configured to receive the third set of optical channels from the first branch and the fourth set of optical channels from the second branch and further configured to combine the third set of optical channels and the fourth set of optical channels to generate a second WDM signal;

wherein the first branch comprises:
  an optical-to-electrical converter configured to convert individual modulated carrier wavelengths received from a first subset of output ports of the first wavelength-selective switch into a corresponding plurality of electrical digital signals; and
  an OTN signal processor configured to electrically switch the payload units carried by said corresponding plurality of the electrical digital signals;

wherein the OTN signal processor comprises one or more electrical add ports connected to an input/output interface that is configured to be disposed between the OTN signal processor and an edge router of a local-area network; and wherein the OTN signal processor is configurable to electrically switch payload units corresponding to electrical digital signals applied to said one or more add ports via the input/output interface.

22. The apparatus of claim 21,
wherein the first branch further comprises an electrical-to-optical converter configured to generate a plurality of WDM components by modulating the payload units received from the OTN signal processor onto a plurality of carrier wavelengths corresponding to the third set of optical channels; and wherein the second wavelength-selective switch is configured to generate the second WDM signal by combining (i) the plurality of carrier wavelengths corresponding to the third set of optical channels and modulated by the electrical-to-optical converter and (ii) the fourth set of optical channels optically switched through the second branch.

23. The apparatus of claim 22, wherein the first branch further comprises an optical multiplexer configured to multiplex said plurality of WDM components to generate a third WDM signal; and wherein the second wavelength-selective switch is configured to generate the second WDM signal by combining the third WDM signal and the fourth set of optical channels optically switched by the second branch.

24. The apparatus of claim 21, wherein the first branch further comprises an optical de-multiplexer configured to generate the individual modulated carrier wavelengths by de-multiplexing one or more WDM signals received from the first wavelength-selective switch.

* * * * *